(12) United States Patent
Walker et al.

(10) Patent No.: US 8,442,517 B2
(45) Date of Patent: May 14, 2013

(54) METHOD AND APPARATUS FOR CONTROLLING COMMUNICATIONS

(75) Inventors: John Michael Walker, The Hague (NL); Stephen Terrill, Villanueva de la Cañada (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 761 days.

(21) Appl. No.: 12/514,030

(22) PCT Filed: Nov. 10, 2006
(Under 37 CFR 1.47)

(86) PCT No.: PCT/EP2006/068326
§ 371 (c)(1),
(2), (4) Date: Dec. 4, 2009

(87) PCT Pub. No.: WO2008/055549
PCT Pub. Date: May 15, 2008

(65) Prior Publication Data
US 2011/0034157 A1   Feb. 10, 2011

(51) Int. Cl.
*H04W 24/00*   (2009.01)
(52) U.S. Cl.
USPC ..... 455/424; 455/423; 455/422.1; 455/67.11; 455/435.1; 455/445

(58) Field of Classification Search .......... 455/424, 455/423, 422.1, 67.11, 435.1, 445
See application file for complete search history.

(56) References Cited

U.S. PATENT DOCUMENTS

| 2003/0002462 A1* | 1/2003 | Tanoue | 370/335 |
| 2005/0193249 A1* | 9/2005 | Poustchi et al. | 714/13 |
| 2006/0063544 A1* | 3/2006 | Zhao et al. | 455/510 |
| 2006/0165067 A1* | 7/2006 | Kitazawa | 370/352 |
| 2006/0171299 A1* | 8/2006 | Skubisz et al. | 370/218 |

\* cited by examiner

*Primary Examiner* — Charles Appiah
*Assistant Examiner* — Khai M Nguyen

(57) ABSTRACT

A method and an apparatus for controlling a communication established between terminals through a telecommunications system. When a malfunction event related to a communication (310) established between terminals is detected (320), a determination (330) is made in the telecommunications system of a faulty terminal and a non-faulty terminal, according to the malfunction event. Subsequently, the telecommunications systems determines (340) whether a terminal is registered for a user identifier which was registered through the faulty terminal, or which is related to it by subscription and, in that case, it establishes (350) a new communication between said registered terminal and the non-faulty terminal. The user of the non-faulty terminal can rely on the telecommunications system to recover automatically the lost communication, without trying to attempt a new communication request with an uncertain result.

20 Claims, 5 Drawing Sheets

METHOD AND APPARATUS FOR CONTROLLING COMMUNICATIONS

FIELD OF THE INVENTION

The present invention relates to a method and an apparatus for controlling a communication established between terminals through a telecommunications system.

BACKGROUND

A telecommunications system comprises a number of telecommunication nodes and a number of communication links. The telecommunication nodes are apparatuses arranged for processing, directly or indirectly, the signaling and/or media exchanged via communication links with the terminals connected to the system so as to allow them to communicate through it. The resources of a particular system in terms of number and kind of telecommunication nodes, and number and kind of communication links, as well as their respective capacities, depend, among others, on factors such as: the number of users the system is intended to serve, the nature of the services offered by or from the system and the type of accesses used by the users to connect their terminals to the system.

Usually, these resources are however not dimensioned for serving simultaneously communications to all the terminals connected/attached to it, or which can eventually connect/attach to it. For example, a given node assigned to process the signaling of a certain number of terminals for allowing them to establish (i.e. make or receive) communications with other terminals, usually, does not have processing and/or communication capabilities to serve simultaneously the establishment of communications for all these assigned terminals. Similarly, a communication link connecting a telecommunication node with another entity (such as other node/s or terminals) has a limited information transfer capability. For these reasons, it is of the utmost importance the implementation of mechanisms which allow detection of faulty situations, and which allow freeing, preferably quickly and in a controlled way, the seized resources for a communication established between two, or more, terminals when a malfunction event related to said communication is detected.

A well known fault detection mechanism comprises the association of a timer to a message which is sent from a terminal or from a node to a communication peer (terminal or node) in the communication, and which needs a reply to be received from said peer. If, for example, a terminal or node becomes faulty during said signaling round trip, and fails to transmit the reply, a time-out takes place, which makes the other intervening entity(ies) in the communication to release all the resources they have allocated for it. However, since signaling round trips as described above do not usually take place all along a communication, other kind of fault detection mechanisms are also desirable.

An example of this kind of mechanism is disclosed in IETF RFC4028 (April, 2005), which can be used for communications established through a telecommunications system using the Session Initiation Protocol SIP. The RFC4028 discloses a session timer for controlling a communication between terminals. The timer is agreed with a certain value when the communication is established, and it is periodically re-started before its expiry, if the communication is still alive, by means of SIP "UPDATE" or "RE-INVITE" messages. If, for example, one of the terminals in the communication becomes faulty, a time-out of the session timer takes place, since no refresh message is received; which makes the peer terminal, as well as an intervening SIP-proxy (a kind of node arranged to route signaling in SIP signaling telecommunications systems), to release the resources it had allocated for said communication.

However, in case of a malfunction situation, although the remaining non-faulty parties (nodes and terminals) can, according to fault detection procedures, get aware of this event, or be notified about it, and then, accordingly, release the allocated resources, the users of all the terminals that were involved in the faulty communication must establish a new one if they still want to communicate.

Nevertheless, the nature of the malfunction event that caused the communication to fail is usually unknown for the non-faulty terminal(s), as the fault may be due to several reasons, such as: a failure on any point in the interconnection network, a failure in an intervening telecommunications node (e.g. a proxy, a media gateway, etc), a malfunction in a counterpart terminal, etc; which can create uncertainties for the user of said non-faulty terminal on, e.g.: whether trying to re-establish the communication immediately, or waiting for a given time to do so, or waiting for the other terminal to re-establish the communication.

SUMMARY OF THE INVENTION

In one aspect, the invention relates to a method for controlling a communication between terminals as claimed in claim 1. In further aspects, the invention relates to an apparatus as claimed in claim 11, and to a computer program as claimed in claim 22. Embodiments of the invention are set out in the dependent claims.

According to the invention, when a malfunction event related to a communication established between terminals is detected, a determination is made in the telecommunications system of a faulty terminal and a non-faulty terminal, according to the malfunction event. Subsequently, the telecommunications system determines whether a terminal is registered for a user identifier which was registered through the faulty terminal, or which is related to it by subscription, and, in that case, it establishes a new communication between said registered terminal and the non-faulty terminal.

Since a registered terminal which relates to the user of the faulty terminal is detected by the telecommunications system, and the communication with the non-faulty terminal is re-established with said registered terminal with its intervention, the user of the non-faulty terminal can rely on the telecommunications system to recover automatically the lost communication, without trying to attempt a new communication request with an uncertain result.

According to one embodiment, a malfunction event is detected in the telecommunication system by checking whether a disruption in the media sent from a terminal involved in a communication has occurred. According to another embodiment, the malfunction event is detected in the telecommunication system by checking whether a time-out for sending a message from a terminal involved in a communication has occurred. According to yet another embodiment, a notification of a malfunction event is received in the telecommunication system from a terminal involved in a communication which has detected a malfunction in said communication.

By monitoring status of the media and signaling exchanged in a communication, as well as by receiving malfunction notifications from an involved terminal, the telecommunications system can collect malfunction information and, according to it, determine which terminal can be considered as faulty and/or as non-faulty, and proceed accordingly.

According to another embodiment, the telecommunications system can send a test message to a terminal involved in the communication, and wait for a subsequent reply, so as to determine said terminal as a faulty-terminal if no reply is received on time. The test message can, according to alternative realizations, be sent at any time in a communication and to any terminal involved on it, or be sent to a particular terminal, which could be determined as faulty according to a detected malfunction event, so as to confirm or discard said terminal to be determined as a faulty terminal.

By sending a test message requesting a reply from the telecommunications system to a terminal involved in a communication which is suspicious of being faulty, a more accurate determination of said terminal as either: faulty or non-faulty, can be made in the telecommunications system; thereby allowing to discard a temporary malfunction in a terminal if the appropriate reply is received on time and, thus, avoiding the subsequent recovery procedure to be executed unnecessarily.

According to one embodiment of the invention, the communication with the non-faulty terminal can be put on-hold from the telecommunications system, and be resumed later, when the faulty terminal, or another terminal registered for the same user identifier which was registered from said terminal, or related to said identifier by subscription, is detected by the telecommunications system, and consents in the re-establishment of the communication.

By putting on-hold the non-faulty terminal some system resources, such as media transmission resources, can be temporarily released and used for other eventual communications. Furthermore, the telecommunications system can add information for the user of the non-faulty terminal in a signaling message which puts its communication on-hold, so as to inform him about the detected fault and/or to inform him that a re-establishment of the communication is being tried from the system. Moreover, by putting on-hold the non-faulty terminal, the subsequent signaling for re-establishing the communication with it can be decreased compared with the signaling that would be needed for accomplishing with a completely new communication establishment with said non-faulty terminal.

According to yet another embodiment, the telecommunications system can start a timer after a malfunction event in a communication is detected for controlling whether further processing steps of the recovery procedure are executed or not.

By establishing a certain time-limit to recover a faulty communication, some resources, which can be still reserved in the telecommunications system for its re-establishment, can be definitively released, and become usable for other communications, at time-out of the controlling timer. The timer can be set, or modified, to a certain value depending on factors such as traffic load conditions of the system and/or subscription data of an affected user.

Further embodiments of the invention relate to the mechanisms for detecting in the telecommunication system the existence of a registered terminal suitable to re-establish the communication with the non-faulty terminal. In one embodiment, this is accomplished at reception in the telecommunications system of a message notifying a registration of a terminal for a user identifier. In another embodiment, this is accomplished at reception in the telecommunications system of a message requesting to recover a previous communication from a terminal registered in the telecommunications system for a user identifier. In both cases, a check is made in the telecommunications system to determine whether said user identifier was registered through the faulty terminal, or whether it is related to said identifier by subscription.

By checking the user identifier of a registering, or registered, terminal, the telecommunications system can determine an appropriate terminal for re-establishing the lost communication, which can be the same terminal that became faulty, now recovered, or another terminal used by the same user of said faulty terminal.

The establishment of the new communication can, according to one embodiment of the invention, be accomplished by sending to the registered terminal information usable for establishing a communication with the non-faulty terminal, such as a user identifier registered through the non-faulty terminal or related by subscription to said user identifier. This information can be used from the registered terminal to request a new communication, which the telecommunication system can use to re-establish the communication with the non-faulty terminal.

By sending information about previously lost, faulty, communications towards the registered terminal, the user of said terminal can be informed about communications he had established when his terminal failed, and receive some data usable to recover the desired one(s).

DETAILED DESCRIPTION

Figure 1:
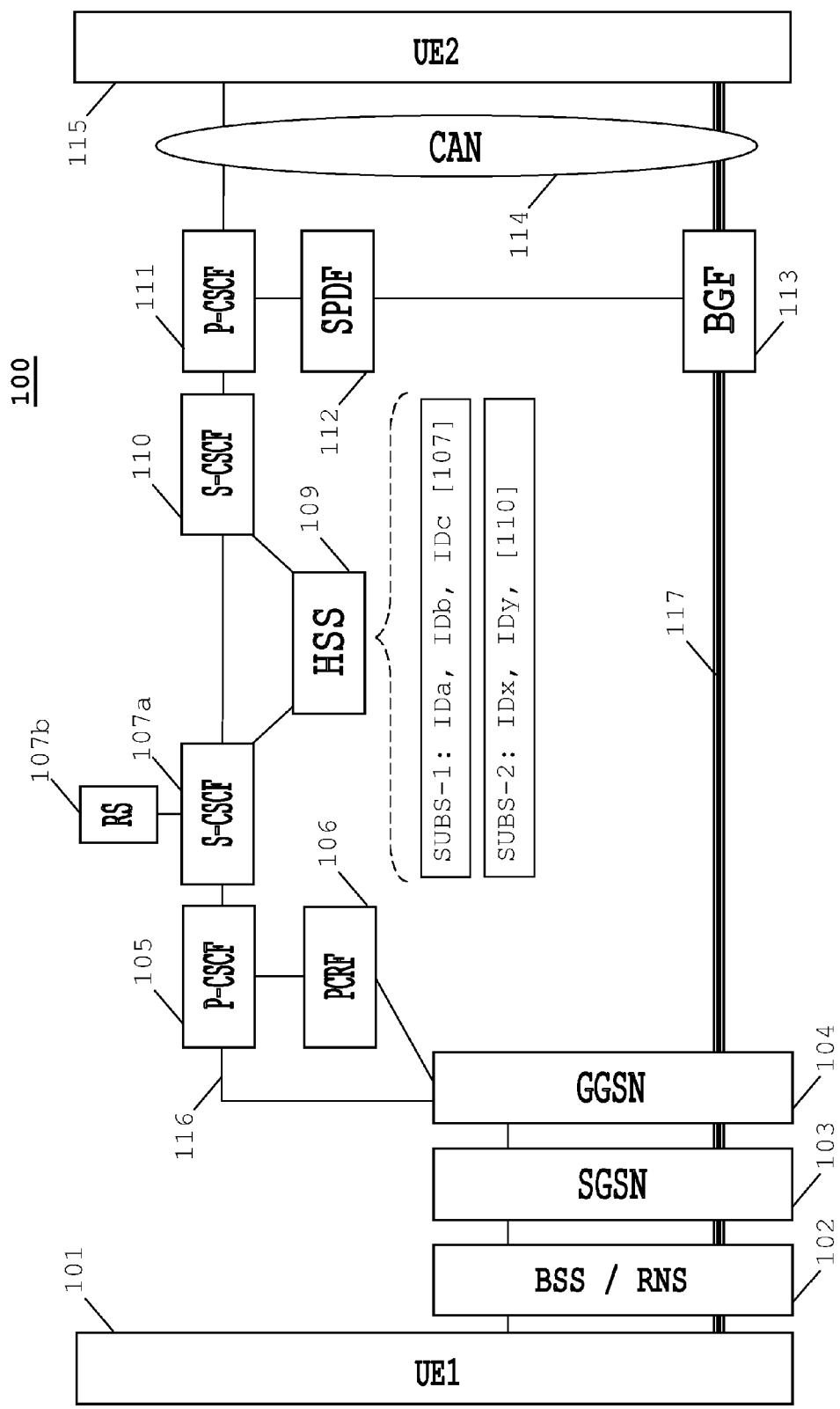
FIG. 1 shows a simplified view of a telecommunications system used to illustrate some embodiments of the invention.

Exemplary embodiments of the invention shall now be described with reference to FIGS. 1 to 5. FIG. 1 illustrates schematically some nodes of a $3^{rd}$ Generation 3G telecommunications system 100 comprising the so called Internet Protocol IP Multimedia Subsystem, or IMS. In short, the IMS allows the establishment of multimedia communications using the SIP protocol for users whose terminals can be connected to the system 100 via a plurality of different types of access networks, such as radio access from a Global System for Mobile communications GSM, Wireless Local Area Networks WLANs, as well as from fixed "wired" networks. The complex telecommunications system shown in FIG. 1 has been selected to illustrate some advantageous embodiments using the same scenario, and, as will be readily apparent for the skilled person, it does not limit the scope of the invention to this particular system.

In the simplified illustration of FIG. 1, a first user terminal 101 is shown in communication with a second user terminal 115. Terminal 101 accesses to the telecommunications system 100 via an access network 102, which comprises a Base Station System BSS, or a Radio Network System RNS, of the 3G telecommunications system 100. The connection of terminal 101 to the IMS is provided via a General Packet Radio System GPRS infrastructure comprising: a Serving GPRS Support Node SGSN 103, and a Gateway GPRS Support Node GGSN 104. In turn, terminal 115 is shown accessing system 100 via another kind of connectivity access network 114, such as a WLAN, a (wired) LAN, or another kind of wired or wireless access, which internal structure is not further detailed.

The users of both terminals are assumed to be subscribed to the IMS of system 100, which, among other nodes, comprises: one or more Home Subscriber Servers HSS 109, for storing subscription and location data of the users and their terminals, and one or more SIP proxies, named Call Session Control Functions CSCFs, which, on their different roles of Proxy P-CSCF (105, 111), Serving S-CSCF (107a, 110), and Interrogating I-CSCF (not shown in FIG. 1), are assigned to process and route signaling exchanged with terminals connected to the IMS of system 100.

Briefly, the role of a S-CSCF for an assigned terminal is to intervene and route its signaling according to data contained in said signaling, as well as according to subscription data received from the HSS for the user of said terminal. In turn, a P-CSCF is the first contact point for a terminal (101, 115) with the IMS; it intervenes in matters related to the media exchanged with said terminal via the access network, and routes its signaling to/from the S-CSCF assigned to the terminal during its registration in the IMS.

When terminals 101 and 115 have a established communication, such as a multimedia communication, through system 100, a signaling channel 116 and one or more media channels 117 are set up between them trough some of the entities of the telecommunications system. The signaling channel 116 is used to transport signaling messages originating and terminating on each of the involved terminals 101 and 115 for, among other purposes, allowing the establishment of the media channel(s) 117 through which media (e.g. voice, data, image, etc) can be exchanged during the time of the communication.

In the scenario illustrated in FIG. 1, two entities perform policy enforcing and monitoring functions on the media exchanged from each terminal, which, for example, can be used to collect information used for flow-based charging, and for controlling/enforcing quality of service of the media channels 117. For terminal 101, this can be performed within the GGSN 104 by means of a functional entity embedded on it known as Policy and Charging Enforcing Function PCEF (not shown). In turn, for terminal 115 this is performed by a Border Gateway Function BGF 113. Policy control decisions for terminals 101 and 115 belong, respectively, to Policy Control and Charging Rules Function PCRF 106 and Session Policy Decision Function SPDF 112. In short, the decision entities (i.e. PCRF 106 or SPDF 112) receive information from, respectively, P-CSCFs 105 and 111, so as to build up policy rules which are downloaded to, respectively, the PCRF within GGSN 104 and the BGF 113, which monitor the data flows according to these rules. According to alternative technical realizations, a PCRF can be embedded within a P-CSCF. Similarly, an entity known as Session Border Controller SBC can embed the functionalities of a P-CSCF (e.g. 111), a SPDF (e.g. 112) and a BGF (e.g. 113).

The HSS 109, as illustrated in FIG. 1, stores subscription data of the user of terminal 101 (SUBS-1) and of the user of terminal 115 (SUBS-2). Among other data of these users, the HSS 109 stores the identifier(s) which, by subscription, are assigned to them (respectively: IDa, IDb, IDc; and IDx, IDy). In case these users are registered into the system 100, the HSS 109 stores also an identifier of the S-CSCF assigned (respectively: 107 and 110) and the user identifiers that these users have registered through their terminals. The HSS 109 becomes aware of a user registered from a terminal by receiving information from a S-CSCF that a registration of a given user identifier of a user has been requested from a terminal. For example, if the user SUBS-1 of terminal 101 registers through S-CSCF 107a his user identifier IDb, the HSS 109 keeps stored this dynamic data during the time of the registration, which allow other nodes in the system 100 to find where to route the initial signaling of a communication addressed for said user identifier by querying to the HSS 109. Details on whether a given user identifier of a user is registered or not through a terminal are not given in the schematic representation of FIG. 1.

A S-CSCF, for example S-CSCF 107a, can be arranged to communicate with an application server AS. The AS can be assigned to perform high-level functions related to the signaling originating from and/or terminating to the terminal 101 of a user SUBS-1, and/or related to the signaling intended for user SUBS-1. In IMS this kind of AS is known as SIP-AS and, for example, can be assigned to process an incoming call addressed to, e.g., the identifier IDa of the user SUBS-1 when he has not registered said identifier through any terminal yet (e.g. the AS can order to play a pre-recorded message and/or can divert the incoming call towards a pre-defined destination terminal). Both: a S-CSCF, and a AS as described above, are examples of nodes arranged to control a communication established between terminals.

According to an alternative realization, the functionality of a recovery server apparatus according to the invention (e.g. RS 107b) can be embedded within an existing SIP-AS assigned to process the signaling of a terminal of a given user. According to other alternative realizations, this novel functionality can reside in a specific AS devoted to this kind of tasks, or be embedded, e.g., as an extra feature, within a S-CSCF. The following description given with reference to the schematic representation of FIG. 2 will consider the latest case.

A telecommunications node, such as S-CSCF 107a or RS 107b, can be implemented as a computer-based apparatus comprising software and hardware, which, depending on construction alternatives, can be located within a physical machine, or be distributed across various cooperating physical machines. Under a functional point of view, the node comprises a set of functional modules comprising: software, hardware, or a combination of both; wherein each functional module is designed to perform a specific (sub)function of the node and, if proceeds, to cooperate with software and/or hardware parts which implements other of its functional modules. The software can comprise one or more computer programs (computer readable program code) that, when executed by the computer-based apparatus makes it to behave according to a predefined manner, as determined by the specific program instructions in said programs, which is in accordance to the specific functionality of the telecommunications node it implements.

Figure 2:
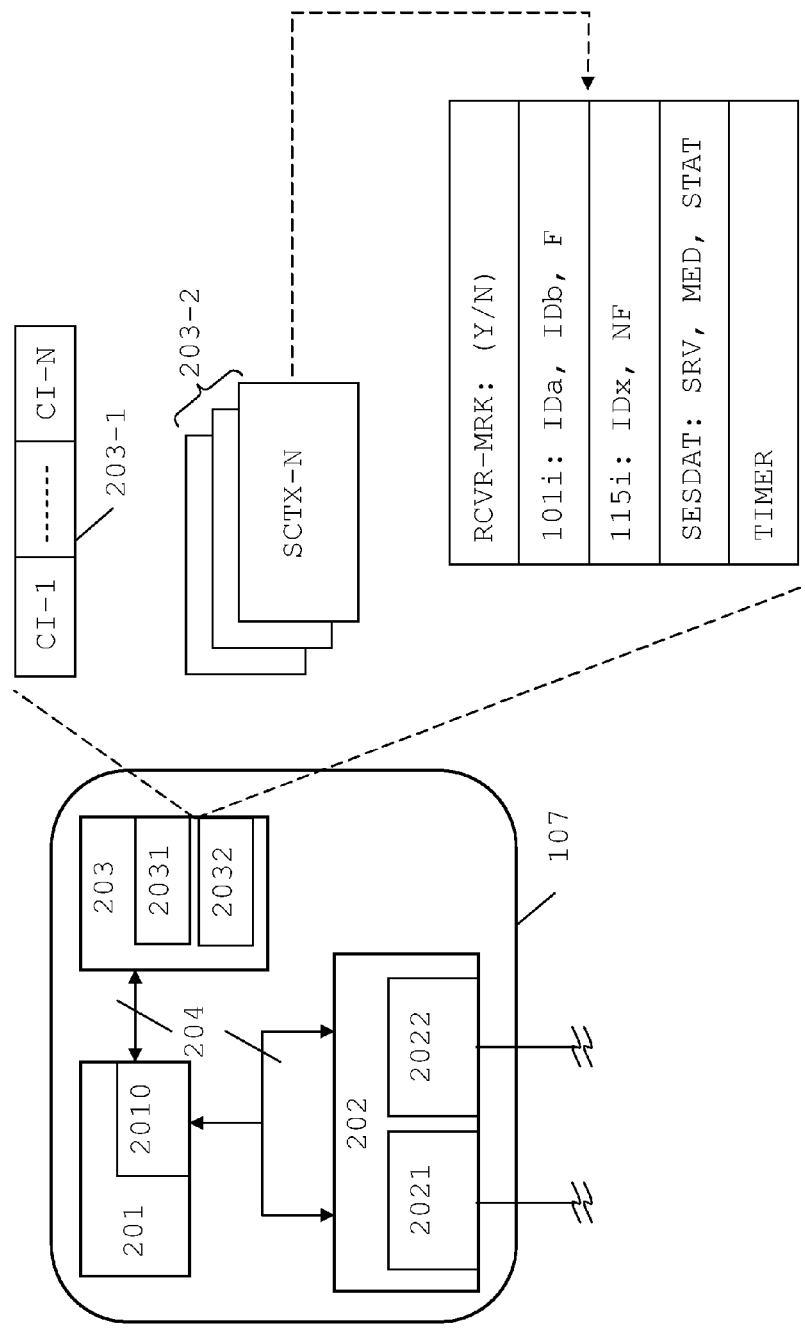
FIG. 2 shows a schematic representation of some functional modules of an apparatus for controlling communications established between terminals according to one embodiment of the invention.

Accordingly, the explanation given with reference to FIG. 2 shall describe some functional components of a S-CSCF 107, arranged to accomplish with aspects of the invention, without falling into specific construction details concerning the possible physical realizations, which are well known by those skilled and which, consequently, are not needed to understand the invention.

The simplified internal structure shown in FIG. 2 for S-CSCF 107 comprises: a processing module 201, a communications module 202, a data storage module 203 and internal communication bus 204 which allow data communication and cooperation between them. It is to be noticed here that, depending on specific characteristics, other kind of nodes, which could be also modified to accomplish with the invention, can comprise further modules (e.g. to perform media transcoding and/or media routing).

The processing module 201 can comprise one processor 2010, or a plurality of processors which, for example, can be arranged to work in load-sharing or active-backup mode.

Processor 2010 in S-CSCF 107 executes service logic for handling the signaling related to the user terminals it has been assigned to serve. This comprises processing of registration messages from these terminals, as well as processing and routing of signaling messages exchanged with these terminals for controlling their communications. The service logic executed by processor 2010 is further enhanced with the novel functionality of the invention that shall be later detailed.

Communications between S-CSCF 107 and other entities (such as: P-CSCFs, HSSs, other S-CSCFs, etc) are performed via communications module 202, which is illustrated in FIG. 2 as comprising two communication devices 2021 and 2022. In general, when a message is to be sent, the processing module requests the communications module to send the message and provides it with the necessary data, and, when a message is received by the communications module, it transfers the relevant content to the processing module for triggering the necessary processing. Depending on implementation alternatives, some of the communication devices (2021, 2022) can be devoted to a specific kind of communication; for example: only with some other node with which a standardized or proprietary signaling interface is used, only for a given type of communication protocol, etc. Also, depending on implementation details, some of the communication devices may be suited to handle any kind of the communications that may be carried out by the S-CSCF according to more than one communication protocol. For example, DIAMETER protocol (IETF RFC3588, September 2003) can be used between a S-CSCF and a HSS or an AS, and SIP protocol (IETF RFC3261, June 2002) can be used between a S-CSCF and a P-CSCF, or another S-CSCF, to control a communication between terminals. These communication protocols (as well as other protocols) can be easily extended for allowing conveyance of new or modified contents, so as to accomplish with invention, as will be later described.

The number of communication devices in S-CSCF 107 may vary depending on their respective capacity for handling external signaling compared with the overall signaling estimated for said node. Depending also on implementation details, a communications module 202 may comprise some functional or physical elements (hardware, software or combination) that may be common to one or more communication devices 2021, 2022, such as a part of a given communications protocol stack, being, the other (protocol specific) parts residing on the corresponding communication device.

Data storage modules 203 and 303 stores the data needed for the operation of S-CSCF 107. A data storage module in a computer-based telecommunications node can comprise one or more data storage devices. In the example illustrated in FIG. 2 the data storage module 203 of S-CSCF 107 comprises storage devices 2031 and 2032. Memory chips and magnetic or optical discs are example of data storage devices. Depending on criteria such as data access speed for certain data, storage reliability, etc, the storage module of a telecommunications node can comprise one or more storage devices of the same or different kind. FIG. 2 illustrates schematically some of the data that can be handled by S-CSCF 107, which shall now be described.

The operation of S-CSCF 107 is controlled by computer-readable program code 203-1 comprising instructions (CI-11 . . . , CI-1N) that, when executed by processor 2010, makes it to perform as a S-CSCF of the state-of-the-art, further performing new functions according to embodiments of the invention.

Reference 203-2 represents a plurality of data records (SCTX-N), each related to the user terminals which are assigned to be served from S-CSCF 107, which have an established communication with another terminal. Within these records the S-CSCF 107 store session related data necessary to perform its controlling functions. FIG. 2 illustrates with further detail some data content of one of these records which, in addition to other necessary data (not detailed in the figure), can be relevant for the accomplishment of some embodiments of the invention.

For example, assuming that S-CSCF 107 has been assigned to serve control of communications to terminal 101, and that terminal 101 has established a communication with terminal 115, the corresponding session record SCTX-N can store information on whether said communication failed because a malfunction event was detected. This can be accomplished by a recovery mark data RCVR-MRK which, in a simple realization, can state whether (Y/N) a recovery action is needed for the failed communication. If the communication failed, some further data can advantageously be stored in the session record SCTX-N, such as: information about the terminals involved in the communication (101$i$, 115$i$), which can comprise user identifier(s) registered through these terminals and/or identifiers usable to route information towards these terminals (IDa, IDb, IDx), data concerning particular conditions of the established communication (SESDAT), and timing information (TIMER) for controlling the re-establishment procedure started from the telecommunications system.

If, e.g., terminal 101 was determined as faulty according to the detected malfunction event, the S-CSCF 107 can store in relationship with information about said terminal 101$i$ a mark (F) stating that terminal 101 was the faulty one, and, in relationship with information about terminal 115 (115$i$) a mark (NF) stating that terminal 115 is the non-faulty terminal. In case of a malfunction related to terminal 101, the information stored can further comprise (IDa, IDb) the user identifier(s) which was(were) registered (or assigned) to said terminal, as well as other user identifier(s) related to said identifier(s) by subscription. As will be later detailed, this can help to recover the lost communication, not necessarily with the same terminal which failed 101, but also with any other terminal that could be being used by the same user.

Some data of the failed communication can be kept in the record SCTX-N, such as the requested service type SRV (e.g. multimedia communication, push-to-talk, etc), or media information MED (e.g. established channels, accepted codecs, etc), which can help to establish later the new communication with similar characteristics as the failed one. For example, some of these data can be sent to the terminal which recovers later the communication with the non-faulty terminal (e.g. for user information purposes and/or for being reused for the new communication). Also, status information STAT of a communication to be recovered can be kept in the session context record SCTX-N, so as to monitor the recovery status according to related events.

As will be apparent from the description, the teachings detailed above in relationship with FIG. 2 with regard to a S-CSCF modified according to the invention, can be easily applied to an alternative embodiment wherein the node 107 controlling the communication, and the subsequent recovery procedure, is an application server (e.g. 107$b$) which cooperates in said control with a S-CSCF (e.g. 107$a$).

Figure 3:
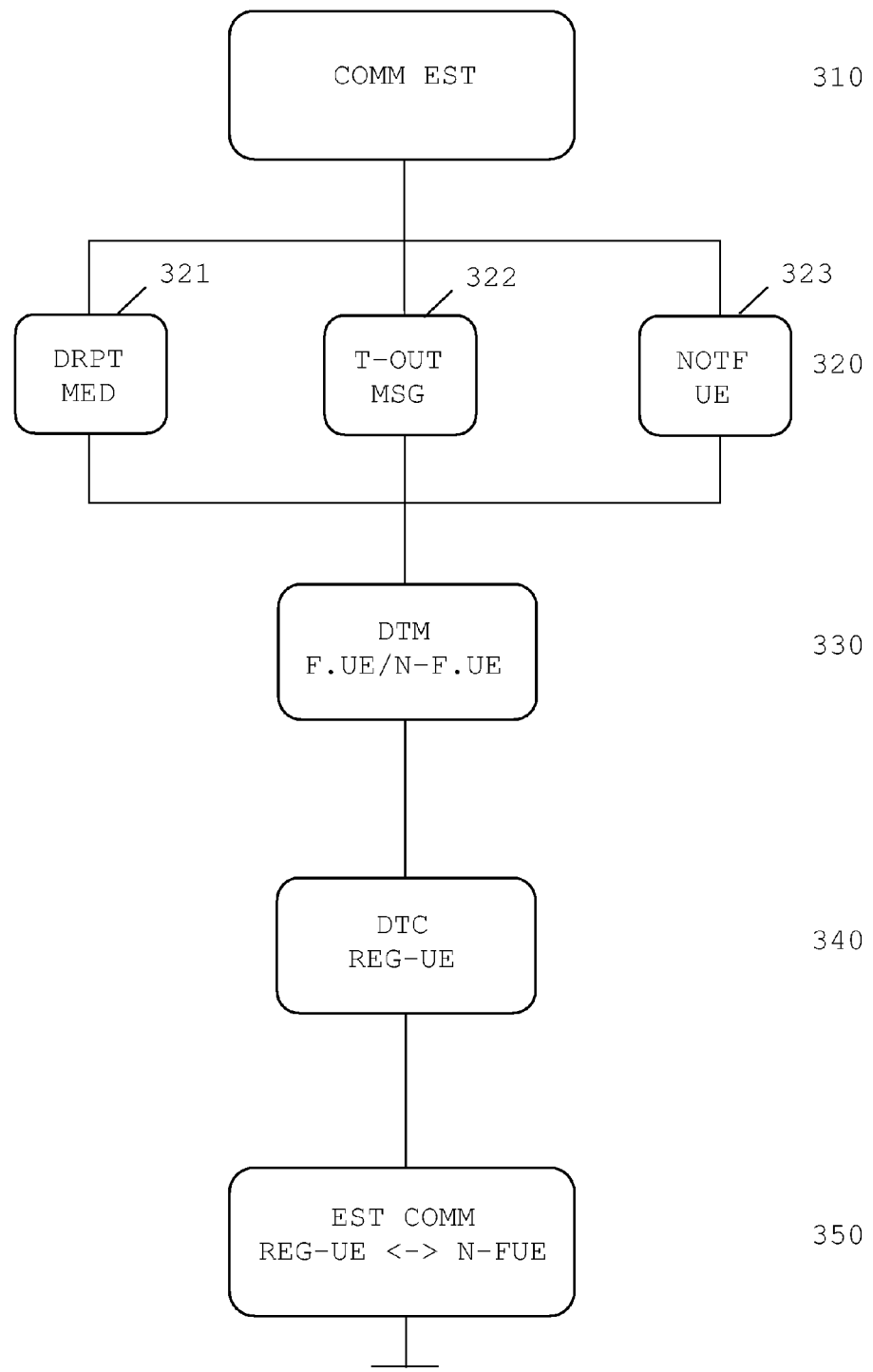
FIG. 3 shows a flowchart illustrating steps of a method for controlling a communications established between terminals according to one embodiment of the invention.

The steps of a method for controlling a communication between terminals according to one embodiment of the invention are illustrated in FIG. 3.

In step 310 the communication established between two or more terminals is controlled from the telecommunications system. As cited earlier, the control of the communication can comprise the intervention of routing/controlling nodes, such as CSCFs, and also the intervention of application servers ASs. In step 320 a malfunction event related to the communication is detected. The discovery of the fault can be made by a node in the telecommunications system, or by one of the involved terminals. Sub-step 321 represents the detection in the telecommunication system of a disruption in the media sent from a terminal. Sub-step 322 represents the detection in the telecommunication system of a time-out for sending a message from a terminal. Sub-step 323 represents the reception in the telecommunication system of a notification of a malfunction event detected by a terminal. Details concerning these sub-steps (321, 322, 323) will be later described with reference to FIG. 4.

According to the detected malfunction event, a determination is made in the telecommunication system in step 330 of a faulty terminal and a non-faulty terminal among the terminals involved in the affected communication. If the malfunction event relates to the media sent from a particular terminal, said terminal can be determined as faulty. If, for example, a terminal in a communication fails to send a reply to a given message which requires so, or, for example, fails to send a refresh message as described earlier with reference to RFC4028, the event can be detected by a node in the telecommunications system involved in the signaling of the communication and, accordingly, said terminal can be determined as faulty. These kinds of malfunction events, i.e.: events related to media disruption, or time-outs for receiving a message, from a peer terminal in the communication, as well as other malfunction events, can be discovered by a terminal in the communication and notified to the telecommunications system, which can determine said peer terminal as a faulty terminal.

The determination of step 330 can be made in one step, when the malfunction event (321, 322, 323) is detected. Alternatively, a preliminary determination of a faulty terminal can be made when a malfunction event is detected. In this case, a test towards the terminal suspicious of being faulty, or to any terminal involved in the same communication, can be started from the telecommunications system, which can help to make a final and more accurate determination of faulty and non-faulty terminal(s) in the communication. A possible realization of said test will be later described with reference to FIG. 5.

In step 340 the telecommunications system starts taking the initiative for recovering the lost communication by detecting whether there is a terminal registered (i.e. permanently connected—as characteristic in some "wired" access networks—, or temporarily attached—as characteristic in "wireless" access networks) which can be suitable to re-establish the communication with the non-faulty terminal. Preferably, said terminal is registered, temporarily or permanently, for a user identifier which is either: the same as the user identifier which was registered through the faulty terminal, or belongs to the same subscription. This helps to ensure that the user of the non-faulty terminal recovers its communication with the same user he was communicating with when the communication failed. For example, using some subscriber data illustrated in FIG. 1, and assuming terminal 101 as faulty, if said terminal was registered for user identifier IDb of SUBS-1, the system can check (e.g. immediately, periodically during a certain time, etc) whether there is a terminal registered for user identifiers: IDa, IDb or IDc.

Step 340 can be accomplished in different ways, which can vary depending on the specific characteristics of the telecommunications system and/or the node(s) arranged to accomplish with the invention. For example, if the telecommunications system incorporates IMS (as shown in FIG. 1) a S-CSCF can send a query (e.g. immediately, periodically during a certain time, etc) to the HSS comprising a user identifier which was registered through the faulty terminal, said query requesting the registration status information of said identifier and/or of any other user identifier related to the same subscription. Alternatively, an application server AS can send a message to the HSS to subscribe to registration event notifications related to a user identifier (i.e. a user identifier registered through the faulty determined terminal) and/or related to the same subscription. Then, if/when a registered terminal is found, the HSS can provide back to the querying S-CSCF, or AS, information usable to enter in communication with it for re-establishing the communication with the non-faulty terminal in step 350.

Some other alternative implementations for accomplishing with step 340, as well as details related to the establishing of the new communication of step 350, shall be later described with reference to FIG. 5.

Figure 4:
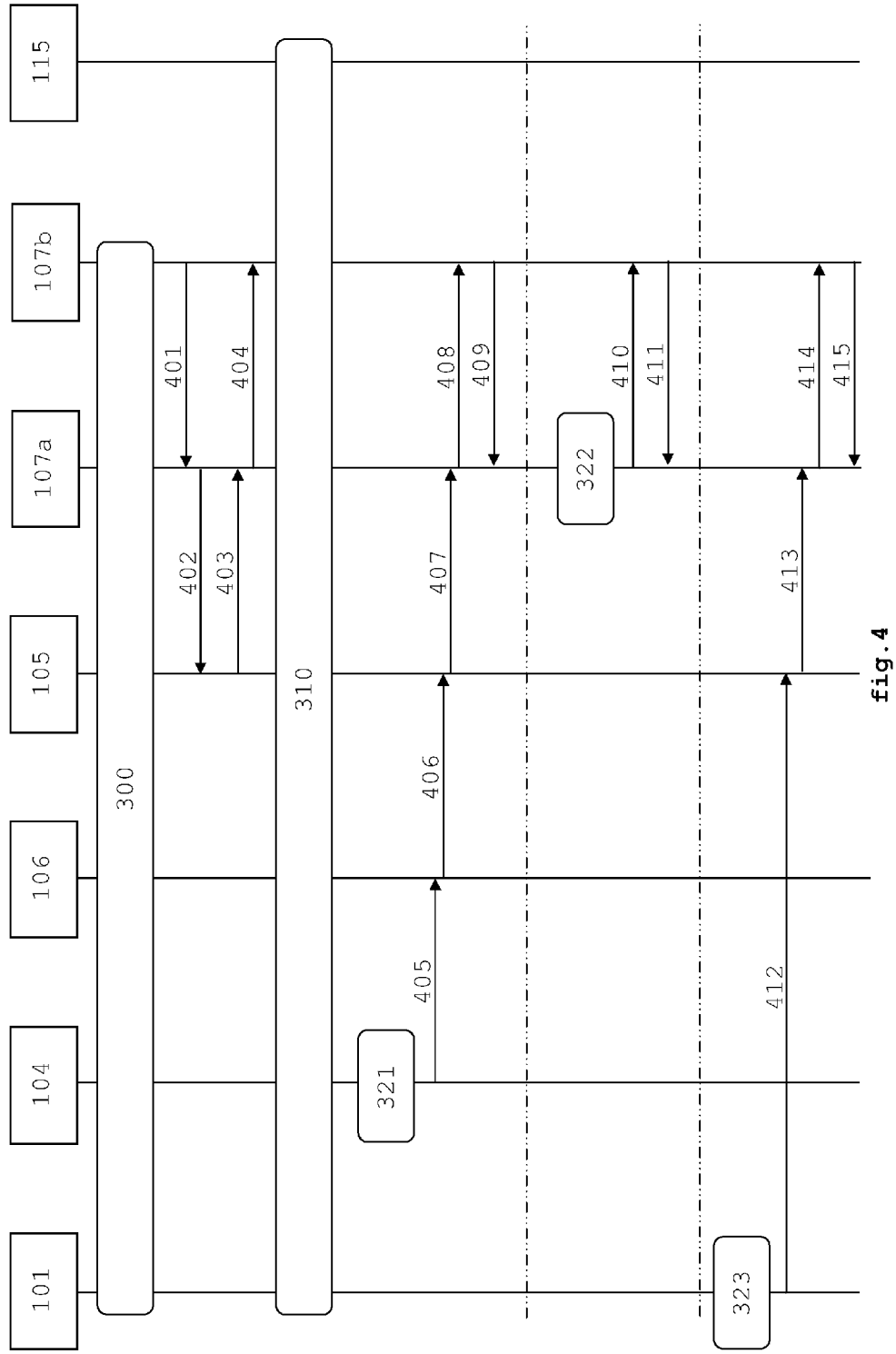
FIGS. 4 and 5 show simplified signaling flows between some of the entities shown in FIG. 1 for illustrating some of the steps of FIG. 3 according to embodiments of the invention.
Figure 5:
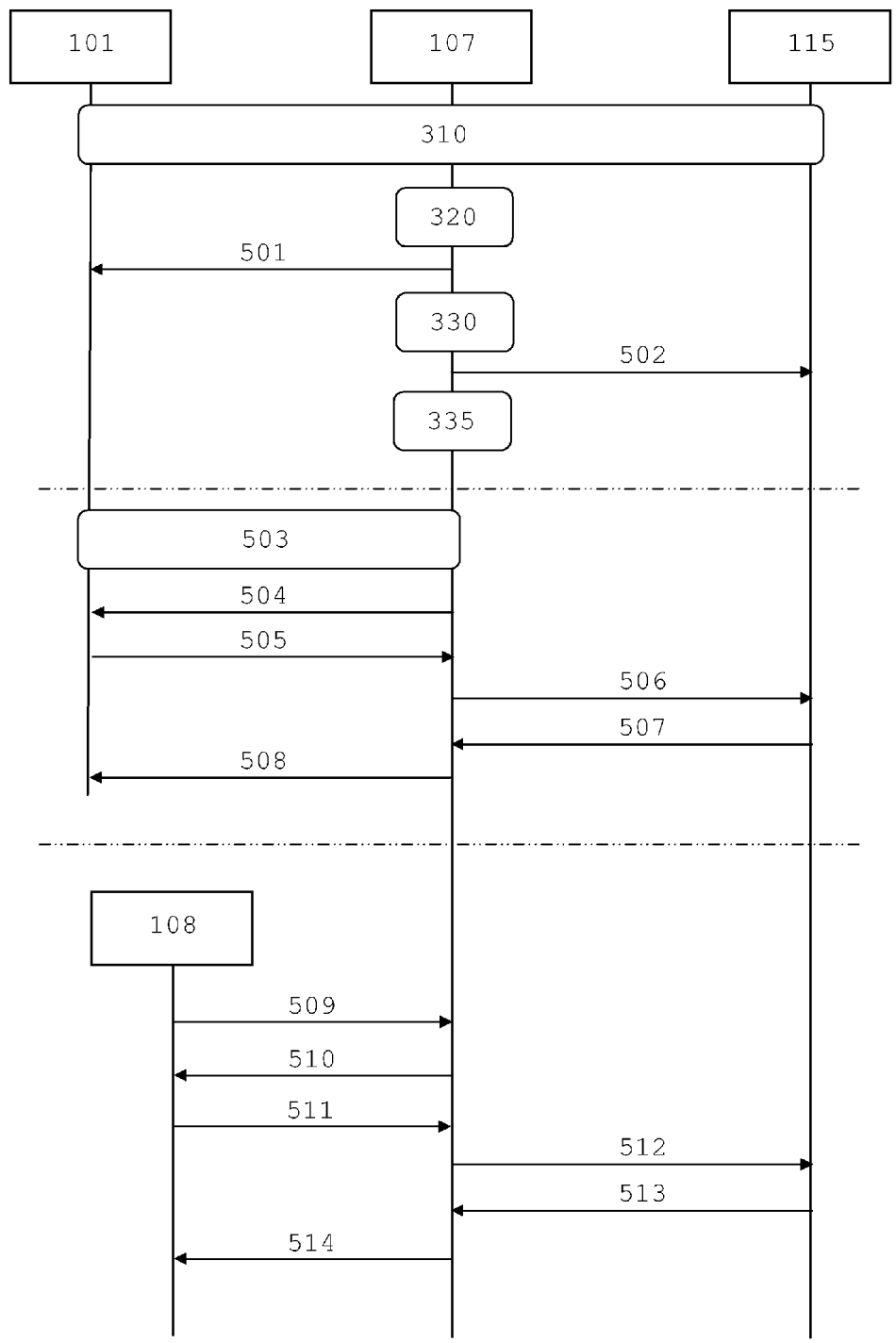

FIGS. 4 and 5 illustrate some relevant signaling flows and sequence of steps of the method described before according to two different embodiments. FIG. 4 considers an embodiment wherein the control of the communication is performed by a S-CSCF 107a and a cooperating AS 107b, and focuses on details concerning early steps of the method of the invention. In turn, the embodiment illustrated in FIG. 5 considers a single telecommunications node 107 performing the control, and focuses on details concerning subsequent steps of the method.

It shall be noticed that, although the communications illustrated in the examples of FIGS. 4 and 5 involve only two terminals, the procedural steps and apparatus(es) modified according to the invention are equally applicable to communications established between a higher number of terminals (e.g. a multi-conference), being the only requirement that at least one node involved in the control of said communication processes a detected malfunction event as described herein.

Step 300 groups the signaling flows which take place at registration of user terminal 101 within the IMS of telecommunications system 100, which are not further detailed in the figure for the sake of clarity. These flows are intended for authenticating the user credentials presented from the terminal 100 and for registering into the system one or more user identifiers of its user. For example, in this phase (300) the user of terminal 101 can be authenticated as subscriber SUBS-1, and register through that terminal one or more of his user identifiers (IDa, IDb, IDc). The 3GPP technical specification TS 24.228 (V5.9.0; June-2004) provides details of this registration phase on chapter 6. User terminal 115 is assumed to be already registered (or permanently connected) to the system 100, and can be assumed to be served from the same S-CSCF 107a as terminal 101, or from another S-CSCF (e.g. S-CSCF 110, not shown in FIG. 4), for its originating and terminating signaling.

The usual end-point for a registration signaling 300 within IMS is the S-CSCF which is assigned for the corresponding user (e.g. S-CSCF 107a). However, as illustrated in FIG. 4, the registration step can involve the intervention of an AS (107b) which can be notified of the registration event, and which receives in the notification a user identifier registered through the terminal. This latest feature is disclosed in Annex B of 3GPP TS 29.328 (V7.3.0; September 2006) and can be used to accomplish with one embodiment of the invention wherein an AS 107b, cooperating with a S-CSCF 107a, performs control functions for a communication established between terminals. This embodiment can be advantageously implemented wherever high-level functions concerning the terminal registered for a given user are performed by an AS which cooperates with a node routing the signaling of said terminal, such as a S-CSCF.

In the illustrated example, when the AS 107b becomes aware of the registration 300 of terminal 101, it subscribes to notifications of faulty events related to communications where said terminal is involved by sending a request to the assigned S-CSCF 107a in flow 401. This action of AS 107b can be performed for any user subscribed to the system, or for some of them (e.g. as determined by subscriber data which can be downloaded from the HSS 109). Accordingly, the AS 107b can store a special mark in relationship with one (or more) user identifier(s) of a user for controlling this behaviour, which it can check when it receives the notification of the registration 300, as said notification comprises the user identifier(s) that are registered from the terminal. The S-CSCF 107a can then transfer the request to the intervening P-CSCF 105 in flow 402, as this node can receive media-related events affecting terminal 101 from the PCRF 106. The request is acknowledged back in flows 403 and 404. Both, P-CSCF 105 and S-CSCF 107a can set a mark in relationship with the data they have stored in relationship with the registration of terminal 101, which allow an eventual malfunction event to be notified to the respective node (e.g. P-CSCF 105 can store the mark in relationship with an identifier of the S-CSCF assigned to serve said terminal, S-CSCF 107a; and S-CSCF 107a can store it in relationship with an identifier of AS 107b).

Step 310 represents the establishment of a communication between terminals 101 and 115. It is to be noticed that there can be other server entities mediating in said communication which relates to nodes assigned to serve and route signaling of terminal 115, such as another S-CSCF and P-CSCF, which are not shown in FIG. 4 for the sake of clarity.

The establishment of a communication 310 between terminals usually implies, not only that signaling links are established between the involved entities (i.e. nodes and terminals), but also that telecommunication resources for conveying related media (such as voice and/or image data) are signaled and booked in the system 100 (flows not shown in FIG. 4). Although a signaling control entity (such as 105, 107a or 107b) can periodically check the status of the media stream(s) related to a communication, preferably a media intervening entity can be arranged to notify automatically media related events to any other controlling entity. Step 321 illustrates the case in which GGSN 104 detects an abnormal event in the media sent from terminal 101 for its communication established with terminal 115. This can be achieved by a special monitoring function of the PCEF within GGSN 104. For example, the monitoring function can detect that no data packets (e.g. Real Time Protocol RTP packets, and/or Real Time Protocol Control RTCP packets) in a data flow related to the media of this communication are sent from terminal 101 in a pre-defined time, which can be due to a malfunction in terminal 101. The malfunction event is notified in flow 405 towards the PCRF 106, which triggers the notification to the P-CSCF 105 and S-CSCF 107a in flows 406 and 407 respectively. The communication of the malfunction event can be accomplished by using DIAMETER protocol (e.g. as defined for "Gx" and "Rx" interfaces) by means of a notify AVP, or a new AVP indicating media malfunction event, and can convey data usable to identify a user and/or a media flow in the affected communication so as to allow to determine the terminal which failed.

At reception of the notification about media malfunction, the S-CSCF 107a notifies the event to AS 107b in flow 408. The notification 408, which can be also accomplished by using DIAMETER protocol, preferably conveys a reference usable to identify the affected (suspicious) terminal and/or his user (e.g. by means of a user identifier), or an identifier of the affected communication (e.g. a session identifier). As described earlier with reference to the apparatus of FIG. 2 for a possible embodiment, the AS 107a can store a recovery mark RCVR-MRK in relationship with the session record data, and determine the affected terminal 101 as the faulty terminal. An acknowledgement can be sent from AS 107b in flow 409. Preferably, in case of media malfunction notification, the S-CSCF 107a or the AS 107b verifies that there was not a previous signaling message from any of the involved terminals (101, 115) which requested the end of the communication (such as a SIP BYE message).

Step 322 represents the detection in S-CSCF 107a of a malfunction event related to the signaling it process for terminal 101. For example, terminal 101 has failed to send an acknowledge to a received message which needs so, or terminal 101 has failed to send a refresh message as disclosed in RFC4028, etc. This kind of malfunction events can be easily detected in a S-CSCF, as it is a statefull SIP proxy server and, as such, is aware of the current status of the communication, e.g., by implementing a state-machine driven by the exchanged signaling messages.

Subsequently, the malfunction event is communicated to AS 107b in flow 410, and acknowledged back in flow 411, as described before for flows 408 and 409. This kind of malfunction event (322) could also be detected by AS 107b if it processes signaling messages related to terminal 101.

Step 323 represents another case wherein a malfunction event is detected in terminal 101. The nature of the detected event can, as described above, be related with the media of its communication with terminal 115, or with an event related to the signaling of said communication. Although, as cited earlier, media and/or signaling monitoring functions can be available in some nodes of a telecommunications system; advantageously, the system is preferably adapted to receive malfunction notifications from terminals, as some of its nodes could be not adapted to perform said monitoring functions, and/or these task could be temporarily unavailable in some of them, e.g., due to overload. By using any SIP message suitable to convey a notification (or by adapting an existing one), the malfunction notification can be sent through the SIP signaling channel to the assigned P-CSCF 105 in flow 412, and from there transmitted to the assigned S-CSCF 107a in flow 413. Subsequent signaling flows 414 and 415 run as described earlier for flows 408 and 409, with the difference that now, due to the fact that the malfunction event has been notified from terminal 101, another peer terminal in the communication (e.g. terminal 115) is to be considered as faulty.

The signaling flows of FIG. 5 show a case wherein a single telecommunications node 107 performs the signaling control of a communication 310 established between terminals 101 and 115. This simplified case has been selected to illustrate more clearly some embodiments of the invention relating to phases which take place once a malfunction event 320 in a communication 310 has been detected. The node 107 can be a S-CSCF, or a AS adapted for the invention which cooperates with one or more S-CSCFs (not shown in FIG. 5) for controlling said communication.

In flow 501 the controlling node 107 sends a message towards terminal 101 to test its functionality in the communication. For example, a malfunction event related to terminal 101 was detected on step 320 and a confirmation of this is desired, so as to discard a temporary malfunction in the terminal. Also, as cited earlier, a test message 501 can be sent at any time to any terminal involved in a communication, being this particularly useful when, due to the nature of the malfunction event, or due to lack of sufficient data in the malfunction notification and/or detection, the determination on which terminal is/are to be considered as faulty can not be made accurately.

Preferably, the controlling node 107 starts a timer waiting a reply to message 501 from terminal 101. Then, the terminal can be finally determined as faulty if a due reply is received before time-out of the timer, and non-faulty otherwise. A particularly advantageous embodiment related to the implementation of the test message 501 comprises the conveyance of some relevant parameters which are the same as the ones used in the communication 310 established between the terminals. For example, message 501 can be accomplished by means of a SIP message RE-INVITE or a SIP message UPDATE, which can indicate that a test is required, and which can convey some parameters used in the establishment of the original communication 310 (e.g. session identifier, counterpart user identifiers, etc); which allows reuse of existing SIP messages for a further purpose. Alternatively, a new message (e.g. a new SIP "TEST" message) can be used for the purpose of message 501.

At reception of message 501 the terminal 101 can perform an internal functional test. Additionally, if conveyed in message 501, the terminal 501 can compare received communication session data with its own data (if said communication still "exists" for the terminal and said data are kept therein). If the test result in the terminal is successful it can send back a SIP 200 OK message, which could prevent node 107 to start the subsequent recovery procedure. The example case illustrated in FIG. 5 considers a situation in which terminal 101 is faulty to the extent that it does not send a reply to message 501. Accordingly, the controlling node 107 determines terminal 101 as faulty and terminal 115 as non-faulty (step 330), and proceeds with subsequent steps for recovery the lost communication.

When the malfunction event is detected, some resources are preferably kept in the telecommunications system. For example, the controlling node 107 can keep some data it had stored about the communication before it failed, which can be useful for re-establishing the communication, and modify and/or store some other data. As disclosed earlier in reference with the apparatus of FIG. 2, a recovery mark RCVR-MRK can be stored, as well as the faulty/non-faulty mark (F/NF) in relationship with data of each of the intervening users or terminals. However, preferably, some other resources are released temporarily, or permanently, waiting for the communication to be recovered. For example, the media resources allocated for the faulty terminal 101 can be permanently released, which can be accomplished by sending from the controlling node 107 the corresponding signaling messages to other nodes (e.g. P-CSCF 105, S-CSCF-110), which can trigger further signaling messages to be subsequently sent to other nodes so as to release allocated media resources and related session records. Media resources utilized by non-faulty terminal 115 to exchange media with the telecommunications system are, however, preferably not permanently released, but can be put on-hold instead; which allow session record memory resources to be kept in other intervening entities, although no media is exchanged for a certain period with terminal 115. Alternatively, the whole communication (including media resources) with non-faulty terminal 115 can be released, wherein the system would later, if proceeds, establish a new communication with said terminal 115.

"Hold" and subsequent "resume" procedures are well-known by those skilled and need not to be further detailed herein.

These procedures are advantageously utilized according to the invention to place on-hold, and later re-establish the media streams utilized by the non-faulty terminal 115.

Flow 502 represents the sending of a signaling message towards the non-faulty terminal for putting its communication on-hold. The message sent in 502 can convey user information for the user of terminal 115 in order he realizes that the telecommunications system is aware that a fault in his communication with a counterpart terminal (101) has been detected, and that a recovery procedure will be tried from the system. Also, in-band (audible) information can be sent towards non-faulty terminal 115 with this purpose. In case of SIP signaling, flow 502 may represent the sending of a SIP message UPDATE indicating "hold".

Preferably, the controlling node starts a timer (step 335) in relationship with the faulty communication 310 (e.g. storing timing information "TIMER" in relationship with data of the failed communication SCTX-N), which can set a certain time limit for trying to establish a communication with the user of the faulty terminal 101; either: from said terminal again, or from another terminal registered in the telecommunications system for said user. The timer started on step 335 advantageously sets a time limit for the controlling node 107 to perform subsequent recovery actions, and, at time-out, for performing a final release of the resources still seized for the failed communication 310, including the held communication with the non faulty terminal 115, and its associated resources.

Regardless the flows precedence illustrated in FIG. 5, the timer 335 can be started at any time once a malfunction event related to a communication has been detected. Its time-out value can be set initially to a certain pre-defined fixed value (e.g. fixed for all cases, set per subscriber data, etc), or to a value which depends on current traffic load conditions on controlling node 107 when it is started, or on traffic load information about other nodes in the system which can be available to node 107. Also, the timer information can be modified once the timer 335 is running; for example, the remaining time can be increased or decreased depending on the current traffic load conditions in the system and/or in the controlling node 107.

The next two different recovery cases illustrated in FIG. 5, which shall now be described, consider that the timer started in 335 has not yet timed-out. Flows 503 to 508 consider a first case wherein the communication is recovered with the same terminal 101 that failed. Flows 509 to 514 consider a second case wherein the communication is recovered with another terminal 108 which is registered into the telecommunications system for the same user identifier(s) which was(were) registered through the faulty terminal 101, or which relate to it(them) by subscription.

A consideration shall be made now with regard to controlling nodes which can be dynamically assigned at registration of a user from a terminal, as S-CSCFs are assigned within the IMS of a telecommunications system. The current state-of-the art for S-CSCF assignation in IMS allows assigning the same S-CSCF for a particular user identifier of a user, although there can be other implementations wherein the S-CSCF assigned for a registration is selected dynamically according to other criteria (e.g. less loaded S-CSCF). In any case, in order to allow a more simple implementation, it is preferable that the node controlling the recovery procedure of the invention, either: a S-CSCF, or a AS—which cooperates with a S-CSCF; is the same. Accordingly, if the new functionality is implemented mainly by a AS, which cooperates with a S-CSCF (as illustrated by AS 107b in FIG. 4), a way of addressing said AS from any S-CSCF in the system that can eventually be assigned in a registration of a user identifier of a user, is to download an identifier of said AS together with the user profile data which are downloaded from the HSS into the S-CSCF during the registration phase; which could make the S-CSCF to contact said AS, for example, at registration from a terminal of a user identifier of a user. Alternatively, if the functionality is implemented by S-CSCFs (e.g. as illustrated by S-CSCF 107 in FIG. 5), a possible way of addressing it at a subsequent registration of the same user identifier (or of another user identifier related to it by subscription) is to forward recovery information from said S-CSCF to the HSS storing the subscription of the involved user (e.g. an indication that a communication recovery is pending from said S-CSCF for said user identifier(s)). In this latest case, the HSS, during the registration phase of the concerned user identifier(s) from a given terminal (e.g. when queried from a I-CSCF, would select said S-CSCF.

Numeral 503 groups the signaling flows which take place at registration of the faulty terminal 101 once it recovered. If terminal 101 is a mobile terminal incorporating an identity module (such as a Subscriber Identity Module SIM card, or an Universal SIM card USIM), it can be assumed that it indicates the same user identifier(s) to be registered during this new registration phase 503. The controlling node 107 gets assigned to the registration and verifies user identifier(s) registered from terminal 101 in the registration phase 503. For example, node 107 can check whether there is a session context record SCTX-N which comprises an identifier registered now from terminal 101, or related to the same subscription, which was marked to be recovered (RCVR-MRK: Y), and wherein the registered identifier was related to a terminal marked as faulty (101*i*: F). For this purpose, the controlling node 107 can check for a match on the identifiers on its internal data (e.g.: within the stored information of a terminal, 101*i*, 115*i*), and/or request to the HSS for the user identifiers related to the user identifier(s) received in the registration phase 503. As an implementation option, the controlling node 107 only considers whether the identifier(s) registered from terminal 101 in the registration phase 503 matches an identifier which was registered when the previous communication failed (i.e. as stated in the information stored in the corresponding record SCTX-N). Alternatively, the controlling node 107 can take into account whether the user identifier(s) received in the registration phase 503 belong to the same subscription as the user identifier(s) which were registered when the previous communication failed. In the latest case, for example, if terminal 101 had registered the identifiers IDa and IDb of the user having the subscription SUBS-1 (see FIG. 1), and now terminal 101 registers the identifier IDc, then, the controlling node 107 can consider that the subsequent recovery procedure can proceed with this terminal.

If a match is found according to any of the embodiments described above, the controlling node 107 can further check whether the recovery timer 335 has not yet time-out. This can be redundant if, for example, the corresponding session context data of the communication to be recovered (SCTX-N) have been released at time-out of timer 335. In flow 504 a recovery message is sent towards terminal 101. If the signaling protocol used is SIP, the recovery message 504 can be accomplished by means of a SIP message REFER comprising, for example: a "request URI" parameter conveying a user identifier registered through terminal 101, a "Call-ID" parameter comprising the session identifier of the SIP session being recovered, and further information such as a user identifier of the user of the non-faulty terminal 115, a communication method conveying the information of the service which was interrupted (e.g.: multimedia communication, push-to-talk, etc.), information about the used media (e.g.: audio, video, data, combinational, etc), etc. These data can be used in terminal 101 for user display information purposes, as well as for communication re-establishment purposes (e.g. in case the user accepts to do so). It shall be noticed that, if more than one communications were ongoing on the faulty terminal when the malfunction event was detected, the message 504 can convey information about any, or all, these communications, as the corresponding information can be kept by the controlling node 107 on its session records 203-2.

If the user of terminal 101 accepts to recover a previously lost communication 310, it can send a communication request message in flow 505. If SIP protocol is used, flow 505 can convey a SIP INVITE comprising data usable to addressing the non-faulty terminal 115, such as a user identifier registered through said non-faulty terminal. The controlling node 107 can check that the communication request 505 refers to a previously faulty communication by checking data about the originating and/or terminating parties (e.g. by using data stored in session records SCTX-N which are marked to be recovered) and, in that case, bring the communication of the non-faulty terminal 115 out of the held state by sending, e.g., a SIP message UPDATE indicating "resume" in flow 506. After that, if the communication resumption is accepted by terminal 115 (flows 507 and 508 can represent SIP 200 OK messages), a new communication is established through the telecommunications system between terminals 101 and 115, as signaled in recovery flows 505 and 506. The recovery timer started on step 335 can be stopped at successful establishment of the new communication. Also, in case it timed-out during the recovery procedure (e.g. during the signaling 504-506), it can be re-started with a given value so as to allow the rest of the procedure to be accomplished.

By putting on-hold the non-faulty terminal (flow 502), the subsequent signaling for re-establishing the communication with the recovered terminal 101 (or 108, as described in the next embodiment of FIG. 5) can be decreased compared with the signaling usually needed for accomplishing with a completely new communication establishment with said non-faulty terminal. Alternatively, if the communication with terminal 115 was not put on-hold before, a communication request by means of a SIP INVITE message could be sent from node 107 towards terminal 115 at reception of flow 505 from terminal 101.

An optimization of the recovery procedure described above can be accomplished by including recovery information within the registration signaling 503 (not detailed in FIG. 5) which is sent from terminal 101. For example, a special application in terminal 101 can make use of communication data of a previously established communication (e.g. preferably in non-volatile memory). Accordingly, when terminal 101 recovers from a malfunction, it can include, for example, session identifier(s) of the session(s) that was(were) ongoing previous to the fault within a registration request (e.g. a SIP message REGISTER). This information could then be used by the controlling node 107 for finding the corresponding session record SCTX-N of the session to be recovered for said terminal, information about the counterpart non-faulty terminal, etc; and perform the recovery actions described above.

When the fault 320 took place, the user of terminal 101 can discard the recovery of the communication he had established with the user of terminal 115 by using the same (faulty) terminal 101, and use instead other terminal 108 he has registered into the system 100. This particular case is illustrated in the second embodiment of FIG. 5.

In flow 509 a recovery request message is received in the controlling node 107. The message can convey a user identifier of the user of terminal 108, and/or a user identifier of the user of the non-faulty terminal 115, which can help the controlling node 107 to identify whether a previously faulty communication related to these data is pending to be recovered (e.g. by finding a stored session record SCTX-N that matches any of the aforementioned criteria). As described in relationship with the previous embodiment, the user identifier(s) registered from terminal 108 can be checked by the controlling node 107, so as to determine whether subsequent recovery actions shall be performed or not.

For example, the controlling node 107 can check whether the identifier(s) registered from terminal 108 matches an identifier which was registered when the previous communication involving terminal 101 failed (i.e. as stated in the information stored in the corresponding record SCTX-N). Alternatively, the controlling node 107 can take into account whether the user identifier(s) which is(are) registered through terminal 108 belongs to the same subscription as the user identifier(s) which were registered through the faulty terminal 101. In the latest case, for example, if terminal 101 had registered the identifiers IDa and IDb of the user having the subscription SUBS-1 (see FIG. 1), and terminal 108 is registered for the identifier IDc, then, the controlling node 107 can consider that the subsequent recovery procedure can proceed with terminal 108, as these identifiers relate to the same subscription (SUBS-1).

In case of acceptance, a message comprising information usable to identify previous faulty communication(s) is sent towards terminal 108 in flow 510. The message in 510 can convey similar information as described above for message 504, which, in a similar manner, can be used in terminal 108 for user display information purposes, as well as for communication re-establishment purposes. The example illustrated in FIG. 5 considers that the user of terminal 108 accepts to reestablish his lost communication with terminal 115 by sending a request to establish a communication in flow 511, the content of which, as well as the corresponding processing by the controlling node 107, can be as described above with reference to flow 505. Subsequently, flows 512 to 514, takes place for re-establishing the communication with non-faulty terminal 115 as described above with reference to flows 506 to 508.

The invention, as described therein, provides a solution for recovering a faulty communication that takes into account a balance between the usage of the, limited, shared resources of a telecommunications system, and user comfort for the user of the non-faulty terminal(s) in the faulty communication.

Currently, telecommunications nodes are mostly implemented in computer-based machines. Accordingly, computer programs comprising computer-readable program codes are loaded in computer-based machines of telecommunications systems causing them to behave according to a predefined manner, as determined by the respective program codes, which are in accordance to the specific functionality specified for the telecommunications nodes these machine implements. Thus, those skilled in creating and/or modifying computer programs, would, without departing of the teachings of the present invention, readily apply them to create and/or modify computer programs suitable to be loaded in computer-based telecommunication nodes, such as nodes arranged for controlling communications and routing related signaling, or specific application servers arranged to perform high-level processing related to said signaling, so as to make them to behave according to any of the described embodiments.

The invention has been described with respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method for controlling a communication established between terminals through a telecommunications system, comprising the steps of:
   a) detecting a malfunction event related to a communication established between the terminals,
   b) determining that there is a faulty terminal and a non-faulty terminal between said terminals according to the malfunction event,
   c) detecting in the telecommunications system a terminal registered for a user identifier which was registered through the faulty terminal or which is related by subscription to said user identifier,
   route a message received from a terminal involved in said communication towards another terminal involved in said communication which requires a reply,
   start a timer for receiving said reply,
   determine said another terminal as the faulty terminal if said reply is not received at time-out of said timer, and
   d) establishing from the telecommunications system a new communication between said registered terminal and said non-faulty terminal.

2. The method of claim 1 wherein step a) comprises the steps of:
   a1) detecting in the telecommunications system a disruption of the media sent from a terminal related to said communication.

3. The method of claim 1 wherein the step a) comprises the step of:
   a2) detecting in the telecommunications system a time-out for sending a message related to said communication from a terminal.

4. The method of claim 1 wherein the step a) comprises the step of:
   a3) receiving in the telecommunications system a message from a terminal involved in said communication notifying the detection of a malfunction event.

5. The method of claim 1 wherein the step "b" comprise the steps of:
   b4) sending a test message from the telecommunications system to a terminal involved in said communication, and
   b5) determining said terminal involved in said communications as a non-faulty terminal if a reply to said message is received from said terminal and as a faulty terminal otherwise.

6. The method of claim 1 further comprising the step previous to step d) of:
   e) sending a message from the telecommunications system to the non-faulty terminal for putting on hold its communication with the faulty terminal, wherein the step d) comprises the step of:
   d1) sending a message from the telecommunications system to the non-faulty terminal for resuming the communication with said registered terminal.

7. The method of claim 1 further comprising the step previous to step c) of:
- f) starting a timer in the telecommunications system, and
- g) determining that said timer has not timed-out before executing step d).

8. The method of claim 1 wherein step c) comprises the step of:
- c1) receiving in the telecommunications system a message notifying a registration of a terminal for a user identifier which was registered through the faulty terminal or which is related by subscription to said user identifier.

9. The method of claim 1 wherein the step c) "c" comprises the step of:
- c2) receiving in the telecommunications system a message requesting to recover a previous communication from a terminal registered in the telecommunications system for a user identifier which was registered through the faulty terminal or which is related by subscription to said user identifier.

10. The method of claim 1, wherein the step d) "d" comprises the steps of:
- d2) sending from the telecommunications system a message to the registered terminal comprising a user identifier registered through the non-faulty terminal or related by subscription to said user identifier,
- d3) receiving in the telecommunications system a message from the registered terminal requesting to establish a communication and comprising data usable for addressing the non-faulty terminal, and
- d4) sending from the telecommunications system a message to the non-faulty terminal requesting to establish a communication with the registered terminal.

11. An apparatus for controlling a communication established between terminals through a telecommunications system that comprises a processor and a storage device in communication with said processor for storing instructions to be executed by said processor to:
- process a detected malfunction event related to a communication established between at least two terminals so as to determine a faulty terminal and a non-faulty terminal between said terminals according to the malfunction event,
- detect a terminal registered in the telecommunications system for a user identifier registered through the faulty terminal or is related by subscription to said user identifier,
- route a message received from a terminal involved in said communication towards another terminal involved in said communication which requires a reply,
- start a timer for receiving said reply,
- determine said another terminal as the faulty terminal if said reply is not received at time-out of said timer, and
- establish a new communication between said registered terminal and said non-faulty terminal.

12. The apparatus of claim 11 wherein the storage device stores further instructions to be executed by said processor to:
- receive a message notifying a disruption of the media ent from a terminal related to said communication, and
- determine said terminal related to said communication as the faulty terminal.

13. The apparatus of claim 11 wherein the storage device stores further instructions to be executed by said processor to:
- receive a message notifying a time-out for sending a message related to said communication from a terminal, and
- determine said terminal related to said communication as the faulty terminal.

14. The apparatus of claim 11 wherein the storage device stores further instructions to be executed by said processor to:
- receive a message from a terminal involved in said communication notifying the detection of a malfunction event.

15. The apparatus of claim 11 wherein the storage device stores further instructions to be executed by said processor to:
- send a test message towards a terminal involved in said communication, and
- determine said terminal as a non-faulty terminal if a reply to said message is received from said terminal and as a faulty terminal otherwise.

16. The apparatus of claim 11 wherein the storage device stores further instructions to be executed by said processor to:
- send a message towards the non-faulty terminal after the malfunction event is detected for putting on hold the non-faulty terminal communication with the faulty terminal, and
- send a message towards the non-faulty terminal for resuming the communication with said registered terminal.

17. The apparatus of claim 11 wherein the storage device stores further instructions to be executed by said processor to
- start the timer after the malfunction event is detected, and
- check that said timer has not timed-out before establishing the new communication.

18. The apparatus of claim 11 wherein, for detecting said registered terminal, the storage device stores further instructions to be executed by said processor to
- receive a message notifying a registration of a terminal for a user identifier, and
- check that said user identifier was registered through the faulty terminal or is related to the faulty terminal by subscription.

19. The apparatus of claim 11 wherein, for detecting said registered terminal, the storage device stores further instructions to be executed by said processor to:
- receive a message requesting to recover a previous communication from a terminal registered in the telecommunications system for a user identifier, and
- check that said user identifier was registered through the faulty terminal or is related to the faulty terminal by subscription.

20. The apparatus of claim 11 wherein, for establishing a new communication between said registered terminal and said non-faulty terminal, the storage device stores further instructions to be executed by said processor to:
- send a message towards the registered terminal comprising a user identifier registered through the non-faulty terminal or related by subscription to said user identifier,
- receive a message from the registered terminal requesting to establish a communication the message comprising data for addressing the non-faulty terminal, and
- send a message towards the non-faulty terminal requesting to establish a communication with the registered terminal.

* * * * *

UNITED STATES PATENT AND TRADEMARK OFFICE
CERTIFICATE OF CORRECTION

Page 1 of 1

PATENT NO. : 8,442,517 B2
APPLICATION NO. : 12/514030
DATED : May 14, 2013
INVENTOR(S) : Walker et al.

It is certified that error appears in the above-identified patent and that said Letters Patent is hereby corrected as shown below:

On the Title Page, in Item (75), under "Inventors", in Column 1, Line 1, delete "The Hague" and insert -- Den Haag --, therefor.

On the Title Page, in Item (75), under "Inventors", in Column 1, Line 2, delete "Caňada" and insert -- Villanueva de la Cañada --, therefor.

In the Specifications

In Column 2, Line 17, delete "etc" and insert -- etc. --, therefor at each occurrence throughout the specification.

In Column 11, Line 58, delete "Control" and insert -- Control Protocol --, therefor.

In Column 16, Line 55, delete "registration signaling 503" and insert -- registration phase 503 --, therefor.

In the Claims

In Column 18, Line 36, in Claim 2, delete "steps" and insert -- step --, therefor.

In Column 18, Line 50, in Claim 5, delete ""b" comprise" and insert -- b) comprises --, therefor.

In Column 19, Line 12, in Claim 9, delete "c) "c"" and insert -- c) --, therefor.

In Column 19, Line 20, in Claim 10, delete "d) "d"" and insert -- d) --, therefor.

In Column 19, Line 57, in Claim 12, delete "ent" and insert -- sent --, therefor.

In Column 20, Line 27, in Claim 17, delete "processor to" and insert -- processor to: --, therefor.

In Column 20, Line 34, in Claim 18, delete "processor to" and insert -- processor to: --, therefor.

Signed and Sealed this
Fifteenth Day of April, 2014

Michelle K. Lee
*Deputy Director of the United States Patent and Trademark Office*